(12) United States Patent
Perronnin et al.

(10) Patent No.: US 9,514,391 B2
(45) Date of Patent: Dec. 6, 2016

(54) FISHER VECTORS MEET NEURAL NETWORKS: A HYBRID VISUAL CLASSIFICATION ARCHITECTURE

(71) Applicant: Xerox Corporation, Norwalk, CT (US)

(72) Inventors: Florent C. Perronnin, Domène (FR); Diane Larlus-Larrondo, La Tronche (FR)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/691,021

(22) Filed: Apr. 20, 2015

(65) Prior Publication Data
US 2016/0307071 A1 Oct. 20, 2016

(51) Int. Cl.
| G06K 9/00 | (2006.01) |
| G06K 9/66 | (2006.01) |
| G06K 9/62 | (2006.01) |
| G06K 9/52 | (2006.01) |

(52) U.S. Cl.
CPC ............. *G06K 9/66* (2013.01); *G06K 9/00456* (2013.01); *G06K 9/00785* (2013.01); *G06K 9/52* (2013.01); *G06K 9/6256* (2013.01); *G06K 9/6267* (2013.01)

(58) Field of Classification Search
None
See application file for complete search history.

(56) References Cited

U.S. PATENT DOCUMENTS

| 2007/0005356 A1* | 1/2007 | Perronnin | ............ G06K 9/4676 704/245 |
| 2010/0098343 A1* | 4/2010 | Perronnin | ............ G06K 9/6226 382/224 |
| 2011/0229045 A1* | 9/2011 | Yu | ....................... G06K 9/00664 382/224 |
| 2012/0045095 A1* | 2/2012 | Tate | ......................... G06T 5/003 382/103 |
| 2012/0316421 A1* | 12/2012 | Kumar | ............... A61B 1/00009 600/407 |
| 2014/0233826 A1* | 8/2014 | Agaian | ................ A61B 5/7267 382/133 |
| 2014/0270431 A1* | 9/2014 | Xu | ..................... G06K 9/00147 382/128 |
| 2015/0125049 A1* | 5/2015 | Taigman | ............ G06K 9/00268 382/118 |

OTHER PUBLICATIONS

Babenko, et al., "Neural codes for image retrieval," ECCV, pp. 584-599 (2014).
Chatfield, et al., "The devil is in the details: an evaluation of recent feature encoding methods," BMVC, pp. 1-12 (2011).
Chatfield, et al., "Return of the devil in the details: deving deep into convolutional nets," BMVC, pp. 1-11 (2014).
Cho, et al., "Kernel method for deep learning," NIPS, pp. 1-9 (2009).
Clinchant, et al., "XRCE's participation to imageval," *ImageEval @ CVIR*, pp. 1-8 (2007).

(Continued)

*Primary Examiner* — Shervin Nakhjavan
(74) *Attorney, Agent, or Firm* — Fay Sharpe LLP (57) ABSTRACT

In an image classification method, a feature vector representing an input image is generated by unsupervised operations including extracting local descriptors from patches distributed over the input image, and a classification value for the input image is generated by applying a neural network (NN) to the feature vector. Extracting the feature vector may include encoding the local descriptors extracted from each patch using a generative model, such as Fisher vector encoding, aggregating the encoded local descriptors to form a vector, projecting the vector into a space of lower dimensionality, for example using Principal Component Analysis (PCA), and normalizing the feature vector of lower dimensionality to produce the feature vector representing the input image. A set of mid-level features representing the input image may be generated as the output of an intermediate layer of the NN.

20 Claims, 9 Drawing Sheets

(56) References Cited

OTHER PUBLICATIONS

Dahl, et al., "Improving deep neural networks for LVCSR using rectified linear units and dropout," *ICASSP*, pp. 82-97 (2013).
Deng, et al., "What does classifying more than 10,000 image categories tell us?," In *ECCV*, pp. 71-84 (2010).
Deng, et al., "ImageNet: A large-scale hierarchical image database," In *CVPR*, pp. 248-255 (2009).
Deng, et al., "Large-scale object classification using label relation graphs," In *ECCV*, pp. 1-17 (2014).
Donahue, et al., "A deep convolutional activation feature for generic visual recognition," *ICML*, pp. 647-655 (2014).
Everingham, et al., "The Pascal visual object classes," *IJCV*, pp. 303-338 (2010).
Girshick, et al., "Rich feature hierarchies for accurate object detection and semantic segmentation," *CVPR*, pp. 580-587 (2014).
Gong, et al., "Multi-scale orderless pooling of deep convolutional activation features," *ECCV*, pp. 392-407 (2014).
Gordo, et al., "Leveraging category-level labels for instance-level image retrieval," *CVPR*, pp. 3045-3052 (2012).
Gosselin, et al., "Revisiting the fisher vector for fine-grained classification," *PRL*, pp. 92-98 (2014).
Hariharan, et al., "Discriminative decorrelation for clustering and classification," *ECCV*, pp. 459-472 (2012).
He, et al., "Spatial pyramid pooling in deep convolutional networks for visual recognition," *ECCV*, pp. 346-361 (2014).
Jaakkola, et al., "Exploiting generative models in discriminative classifiers," *NIPS*, pp. 487-493 (1998).
Jegou, et al., "Negative evidences and co-occurrences in image retrieval: the benefit of PCA and whitening," *ECCV*, pp. 774-787 (2012).
Jegou, et al., "Hamming embedding and weak geometric consistency for large scale image search," *ECCV*, pp. 304-317 (2008).
Jegou, et al., "Product quantization for nearest neighbor search," *IEEE TPAMI*, pp. 117-128 (2011).
Jegou, et al., "Aggregating local descriptors into a compact image representation," *CVPR*, pp. 3304-3311 (2010).
Jegou, et al., "Aggregating local descriptors into compact codes," *TPAMI*, pp. 1704-1716 (2012).
Krizhevsky, et al., "ImageNet classification with deep convolutional neural networks," *NIPS*, pp. 1097-1105 (2012).
Liu, et al., "Encoding high dimensional local features by sparse coding based Fisher vectors," *NIPS*, pp. 1143-1151 (2014).
Lazebnik, et al., "Beyond bags of features: Spatial pyramid matching for recognizing natural scene categories," *CVPR*, pp. 2169-2178 (2006).
Le, et al., "Building high-level features using large scale unsupervised learning," *ICML*, pp. 8595-8598 (2012).
Lecun, et al., "Handwritten digit recognition with a back-propagation network," *NIPS*, pp. 1-9 (1989).
Lin, et al., "Large-scale image classification: Fast feature extraction and SVM training," *CVPR*, pp. 1-8 (2011).
Lowe, "Distinctive image features from scale-invariant keypoints," *IJCV*, pp. 91-110 (2004).
Nister, et al., "Scalable recognition with a vocabulary tree," *CVPR*, pp. 2161-2168 (2006).
Oquab, et al., "Learning and transferring mid-level image representations using convolutional neural networks," *CVPR*, pp. 1717-1724 (2014).
Paulin, et al., "Transformation pursuit from image classification," *CVPR*, pp. 1-9 (2014).
Peng, et al., "Boosting VLAD with supervised dictionary learning and high-order statistics," *ECCV*, pp. 660-674 (2014).
Peng, et al., "Action recognition with stacked Fisher vectors," In *ECCV*, pp. 581-595 (2014).
Perronnin, et al., "Fisher kernels on visual vocabularies for image categorization," *CVPR*, pp. 1-8 (2007).
Perronnin, et al., "Improving the fisher kernel for large-scale image classification," *ECCV*, pp. 143-156 (2010).
Rahimi, et al., "Random features for large-scale kernel machines," *NIPS*, pp. 1177-1184 (2007).
Razavian, et al., "CNN features off-the-shelf: An astounding baseline for recognition," *CVPR Deep Vision Workshop*, pp. 806-813 (2014).
Russakovsky, et al., "Imagenet large scale visual recognition challenge," arXiv, pp. 211-252 (2014).
Sanchez, et al., "High-dimensional signature compression for large-scale image classification," *CVPR*, pp. 1665-1672 (2011).
Sanchez, et al., "Modeling the spatial layout of images beyond spatial pyramids," *PRL*, pp. 2216-2223 (2012).
Sanchez, et al., "Image classification with the fisher vector: Theory and practice," *IJCV*, pp. 222-245 (2013).
Sermanet, et al., "OverFeat: Integrated recognition, localization and detection using convolutional networks," In *ICLR*, pp. 1-16 (2014).
Simonyan, et al., "Deep fisher networks for large-scale image classification," In *NIPS*, pp. 163-171 (2013).
Simonyan, et al., "Very deep convolutional networks for large-scale image recognition," arXiv, pp. 1-14 (2014).
Sydorov, et al., "Deep Fisher kernels—End to end learning of the Fisher kernel GMM parameters," *CVPR*, pp. 1402-1409 (2014).
Wei, et al., "CNN: single-label to multi-label," arXiv, pp. 1-14 (2014).
Weston, et al., "Large scale image annotation: Learning to rank with joint word-image embeddings," *ECML*, pp. 21-35 (2010).
Yosinski, et al., "How transferable of features in deep neural networks," arXiv, pp. 1-9 (2014).
Zeiler, et al., "On rectified linear units for speech processing," In *ICASSP*, pp. 3517-3521 (2013).
Zeiler, et al., "Visualizing and understanding convolutional networks," In *ECCV*, pp. 818-833 (2014).
Zhou, et al., "Image classification using super-vector coding of local image descriptors," *ECCV*, pp. 141-154 (2010).

\* cited by examiner

FISHER VECTORS MEET NEURAL NETWORKS: A HYBRID VISUAL CLASSIFICATION ARCHITECTURE

BACKGROUND

The following relates to camera-based survey systems to monitor road usage or the like, quality control inspection systems, and other computer vision tasks; and to image classification, processing and archiving arts, and related arts.

Cameras, both still and video, are increasingly being deployed for tasks such as: assessing road usage by vehicle type, in-state versus out-of-state traffic; machine vision assembly line tasks such as quality control inspection/defect detection; document classification; and the like. For example, in road monitoring, vehicles are imaged and classified by vehicle type (e.g. commercial truck, passenger car, or so forth), by license plate type (e.g. in-state plate versus out-of-state plate), or so forth. In quality control inspection, a part moving along an assembly line may be imaged and classified as defective or not defective based on the image. In document classification, an incoming filled-out form may be imaged using a document scanner and the resulting page image classified as to the type of form.

In each of these applications, the image is classified using an empirically trained image classifier. This task is challenging, because the image being classified may differ from the training images used to train the classifier due to differences in lighting, subject position or orientation, subject-to-camera distance, or so forth. Some of these differences can be compensated prior to input to the image classifier, for example by applying a spatial registration algorithm or rescaling the image—but such operations can also undesirably distort the image.

A known image classification architecture is the bag-of-patches (BoP) pipeline. In this approach, local descriptors are extracted from an image and encoded and aggregated to form an image feature vector. The feature vector is input to a kernel classifier such as a Support Vector Machine (SVM) classifier to generate the image classification. Encoding the features by computing higher-order statistics, such as the Fisher Vector (FV) encoding, has been found to provide good image classification performance in conjunction with a linear kernel classifier. The training phase is computationally efficient as the feature extraction and encoding is unsupervised. Only the kernel classifier is trained on a set of labeled training images, and this can be formulated as a convex optimization that is insensitive to the parameter initialization.

More recently, convolutional neural network (CNN) architectures have been shown to outperform BoP pipelines for image classification tasks. In the image classification context, these CNN image classifiers operate directly on the image, rather than on a feature vector extracted from the image. The neurons of the CNN are arranged to operate on overlapping spatial regions of the image, i.e. on overlapping CNN spatial receptive fields. CNNs are feed-forward architectures involving multiple computational layers that alternate linear operations such as convolutions or average-pooling and non-linear operations such as max-pooling and sigmoid activations. Advances in graphical processing unit (GPU) systems, primarily for use in video gaming, has helped drive the development of CNN image classifiers.

BRIEF DESCRIPTION

In some illustrative embodiments disclosed herein, a computer is programmed to perform an image classification method including the operations of: generating a feature vector representing an input image by unsupervised operations including extracting local descriptors from patches distributed over the input image; and generating a classification value for the input image by applying a neural network (NN) comprising an ordered sequence of layers to the feature vector, where each layer of the ordered sequence of layers is applied by performing operations including a linear vector projection and a non-linear vector transformation. In some embodiments the unsupervised operation of extracting the feature vector includes the further operations of encoding the local descriptors extracted from each patch using a generative model, such as Fisher vector encoding, and aggregating the encoded local descriptors to form a vector, and may include the further unsupervised operation of projecting the vector formed by the aggregating into a space of lower dimensionality than the dimensionality of the vector formed by the aggregating to produce a feature vector of lower dimensionality, for example using Principal Component Analysis (PCA), and normalizing the feature vector of lower dimensionality to produce the feature vector representing the input image. In some embodiments the operation of generating the classification value may further include generating a set of mid-level features representing the input image as the output of an intermediate layer of the ordered sequence of layers that is not the last layer of the ordered sequence of layers.

In some further illustrative embodiments in accord with the immediately preceding paragraph, the computer is further programmed to perform an image classifier training method comprising the operations of: (1) for each training image of a set of training images, generating a training image feature vector representing the training image by the same unsupervised operations that generate the feature vector representing the input image; and (2) training the neural network (NN) on a training set comprising the generated training image feature vectors annotated by labels of the represented training images. The unsupervised operations are not trained using supervised learning that utilizes labels of the set of training images.

In still further illustrative embodiments in accord with the immediately preceding two paragraphs, a camera arranged to acquire the input image as an image of a person or vehicle to be classified, and the set of training images comprise a set of training images of persons or vehicles, with the labels of the training images being labels of the persons or vehicles imaged by the training images, in which embodiments the classification value for the input image that is generated by the image classification method is effective to classify the person or vehicle to be classified respective to a classification scheme of which the labels of the training images are examples. In still yet other illustrative embodiments in accord with the immediately preceding two paragraphs, a document scanner configured to acquire the input image as an image of a printed page to be classified, and the set of training images comprise a set of training images of printed pages, with the labels of the training images being labels of the printed pages imaged by the training images, so that the classification value for the input image that is generated by the image classification method is a page classification value that classifies the printed page to be classified.

BRIEF DESCRIPTION OF THE DRAWINGS

FIGS. 4A, 4B, and 4C-7 report experimental results as described herein.

DETAILED DESCRIPTION

CNN image classifiers operating directly on overlapping image regions via the overlapping receptive fields of the neural network have been found to outperform BoP classifiers that operate on feature vectors extracted from the image. Advantageously, the increasing availability of GPU systems facilitates use of CNN image classifiers.

However, CNN image classifiers have certain disadvantages. The CNN architecture compares overlapping image regions via overlapping receptive fields. To use this approach, the image undergoing classification is cropped, re-sized, or re-dimensioned (e.g. stretched) as needed to match the size and aspect ratio of the training images. Any image distortion introduced by these operations can lead to spatial mismatch between the image being classified and the training images, which can degrade performance of the CNN classifier. The CNN architecture based on overlapping receptive fields also means that CNN image classifiers do not exhibit strong geometric invariance properties, and thus the image undergoing classification may need to be spatially registered via shift or rotation operations before input to the CNN image classifier. In addition to possibly leading to further image distortion, a suitable reference for the spatial registration may not be readily available.

A further disadvantage is that the training of the CNN is not a convex optimization process, and usually requires a large set of labeled training image examples in order to achieve high classification accuracy. Even with GPU or cluster computing resources, this initial training phase can be computationally burdensome. This, in turn, may lead to less frequent re-training of the CNN image classifier, which can negate CNN image classification accuracy as compared with BoP systems if salient characteristics of images being classified evolve significantly over time.

In improvements disclosed herein, an image classifier is disclosed, in which the image to be classified is first processed to extract a set of local descriptors which are encoded and aggregated to form an image feature vector, such as a Fisher vector. This is analogous to a typical BoP pipeline. In some embodiments, the initial feature vector of low-level descriptors is projected into a lower dimensional space by a technique such as principal component analysis (PCA), and may be normalized. These are unsupervised operations that do not require training on labeled training data. The resulting feature vector then serves as input to a Neural Network (NN) classifier. As demonstrated in experiments reported herein, this hybrid BoP/NN pipeline was found to provide a substantial improvement in image classification accuracy as compared with conventional BoP image classifier employing a kernel classifier, while also retaining numerous benefits of the BoP image classifiers including the ability to classify images of different size and aspect ratio compared with the training images, and retaining the property of geometric invariance. The NN classifier is more computationally complex than the kernel classifier employed in conventional BoP image classifiers, but significant training speed is gained over a CNN image classifier that operates directly on the image due to the smaller data set size represented by the input feature vector, especially if dimensionality reduction is performed by projection into a lower dimensional space.

As shown in experiments reported herein, the BoP/NN pipeline provides improved image classification accuracy as compared with a BoP pipeline employing a kernel classifier. By contrast to this result, the benefit attained by conventional CNN image classification operating directly on images has generally been ascribed to direct use of the image data via receptive fields of the CNN operating on spatially overlapping image regions, which maximally leverages all data contained in the image in performing the image classification. This intuitive operational paradigm is lost when the image that usually serves as input to the CNN image classifier is replaced by a feature vector representing the image. The feature vector constitutes a loss of information compared with the image as a whole, and this information loss is generated by unsupervised operations that are not trained on examples that are labeled for any specific task so as to preferentially retain information salient to that task.

Figure 1:
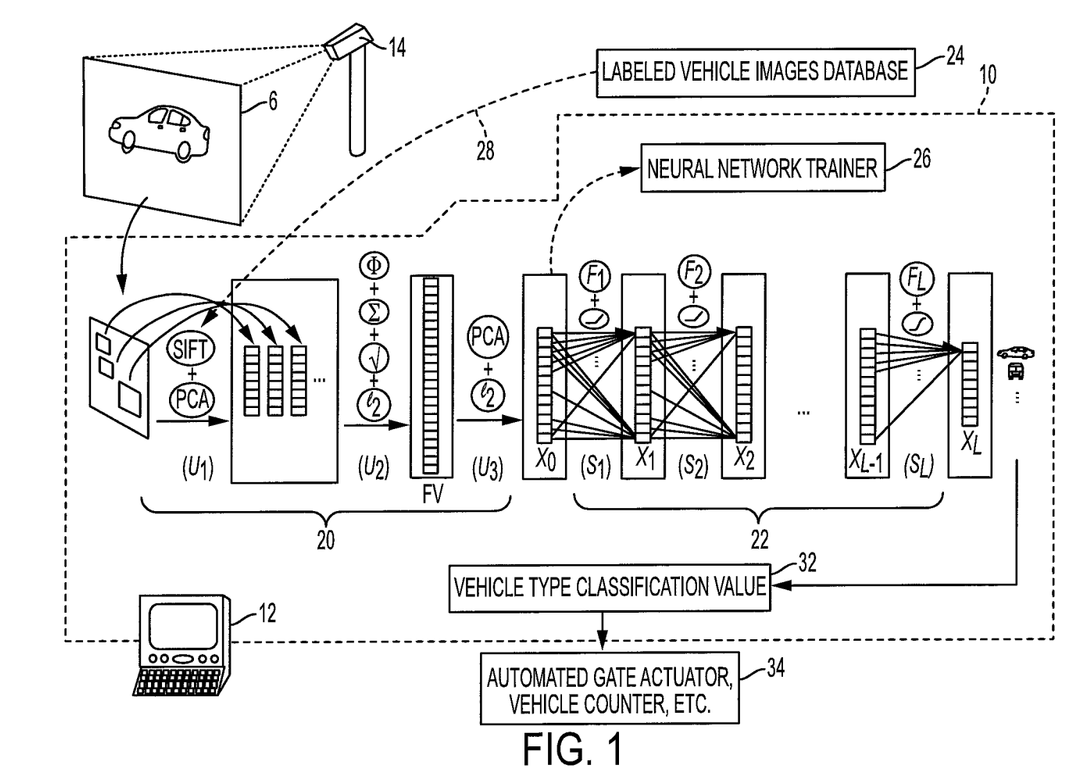
FIG. 1 diagrammatically shows a bag-of-patches/neural network (BoP/NN) image classifier as disclosed herein, with some illustrative applications diagrammatically indicated.

With reference to FIG. 1, an illustrative embodiment of a BoP/NN image classifier 10 is implemented via a computer 12 or other electronic data processing device that is programmed to perform the disclosed image classification operations. It will be appreciated that the disclosed image classification approaches may additionally or alternatively be embodied by a non-transitory storage medium storing instructions readable and executable by the computer 12 or other electronic data processing device to perform the disclosed image classification employing a hybrid BoP/NN architecture. The non-transitory storage medium may, for example, include a hard disk drive, RAID, or other magnetic storage medium; an optical disk or other optical storage medium; solid state disk drive, flash thumb drive or other electronic storage medium; or so forth. A camera 14 is arranged to acquire an input image 16, in the illustrative example an image of a vehicle to be classified. More generally, other applications may be supported, such as a camera arranged to acquire an image of a person to be classified. In another illustrative example, a document scanner may include a flatbed, document feeder or the like and an optical scanner to acquire the input image as an image of a printed page to be classified. The BoP/NN image classifier 10 includes unsupervised operations 20 that output on the input image 16 to generate a feature vector $x_0$ representing the input image 16, followed by a neural network (NN) comprising an ordered sequence of supervised operations (i.e. layers) 22 that receive the feature vector $x_0$ as input.

The supervised layers 22 (i.e. the NN 22) are trained on a set of labeled training images 24 by a NN trainer 26. In the illustrative embodiment, the set of labeled training images 24 comprises a database of images of vehicles each labeled to indicate a vehicle type using a classification scheme of interest (such as, by way of example, a classification scheme including the following classes: "passenger vehicle", "light commercial truck", "semi-trailer truck", "bus", et cetera). More particularly, the supervised layers 22 are trained by the NN trainer 26 operating on a set of training image feature vectors representing the training images 24, where the training image feature vectors are generated by applying the unsupervised operations 20 to each training image. This is diagrammatically indicated in FIG. 1 by a dashed arrow 28 indicating input of the training images 24 to the unsupervised layers 20, and by dashed arrow 30 indicating input of the resulting training image feature vectors to the NN trainer 26. By contrast, the unsupervised operations 20 are not trained using supervised learning that utilizes labels of the set of training images 24.

For use in classifying the image 16 of the vehicle to be classified, the set of training images 24 suitably comprise a set of training images of vehicles, with the labels of the training images suitably being labels of the vehicles imaged by the training images in the chosen classification scheme (e.g., chosen from classes: "passenger vehicle", "light commercial truck", "semi-trailer truck", "bus", et cetera). The labels may, for example, be manually annotated labels added by a human annotator. As another example, in a document page classifier, the set of training images would suitably comprise a set of training images of printed pages, with the labels of the training images being labels of the printed pages using a classification scheme such as: "email printout page", "text page", "drawing page", or so forth).

The illustrative unsupervised operations 20 employ a bag-of-patches approach in which image patches are described by Principal Component Analysis (PCA)-projected local descriptors such as shape descriptors, texture descriptors, Scale-Invariant Feature Transform (SIFT) descriptors or color descriptors (unsupervised operations collectively designated $u_1$). These descriptors are then embedded using Fisher Vector (FV) encoding and aggregated to produce an image-level representation that is normalized by square-rooting and $l_2$-normalization (unsupervised operations collectively designated $u_2$). The resulting (aggregated) FV is PCA-projected and re-normalized (unsupervised operations collectively designated $u_3$).

The ordered sequence of supervised layers of the illustrative NN 22 of FIG. 1 are designated without loss of generality as layers $(s_1)$, $(s_2)$, . . . $(s_L)$. The number of supervised layers is in general L≥2, and in some embodiments the number of supervised layers is L≥4. Each illustrative non-final supervised layer $(s_1)$, $(s_2)$, . . . $(s_{L-1})$ comprises a linear projection followed by a non-linear transform such as a Rectified Linear Unit (reLU). The last supervised layer $(s_L)$ comprises a linear projection followed by a non-linear transform such as a softmax or a sigmoid, and produces the label estimates, i.e. classification value. This illustrative BoP/NN architecture is a deep architecture which stacks several unsupervised and supervised layers. While illustrative FIG. 1 employs only SIFT descriptors, in other embodiments other low level descriptors of the patches, such as color descriptors, may additionally or alternatively be employed.

The last supervised layer $S_L$ outputs the label estimates $x_L$. A vehicle type classification value 32 (or other classification value, depending on the classification scheme) represents the classification of the person or object or printed page that is imaged by the input image). The output classification value 32 may be the vector of label estimates $x_L$ produced by the last layer $s_L$ of the NN 22, or the classification value 32 may be generated by further processing of the label estimates vector $x_L$—for example, such further processing may include selecting the label having the highest label estimate in the vector $x_L$ as the classification value 32 (here the classification value 32 may be a text label, for instance), or applying thresholding to the label estimates of the vector $x_L$ to produce a sub-set of labels for the person, object, printed page, etc, or so forth.

The vehicle type classification value 32 may be used for various purposes, as diagrammatically indicated in FIG. 1 by further processing block 34. For example, in a restricted access gate application, an automated gate actuator may be operated to open the gate if the vehicle type is one admissible through the gate, or to keep the gate closed if the vehicle type is one that is not admissible. (For example, such an application may admit passenger cars into a garage with low clearances, but refuse entry to larger vehicles such as buses or trucks). As another illustrative example, the further processing 34 may include operating an automated vehicle counter monitoring a section of highway to increment the count of the number of vehicles passing along the highway of the type designated by the vehicle type classification value 32. In another example, if the input image is a facial image and the BoP/NN classifier 10 is trained to classify a facial image as "authorized" or "unauthorized" then operation 34 may comprise operating an entryway to admit or refuse entry of the person based on the classification value. As yet another illustrative example, if the input image is a printed page that has been scanned, the classification value may be used to determine whether the page needs to be printed and retained in a corresponding physical file. These are merely non-limiting illustrative applications of the output of a BoP/NN classifier as disclosed herein.

Figure 2:
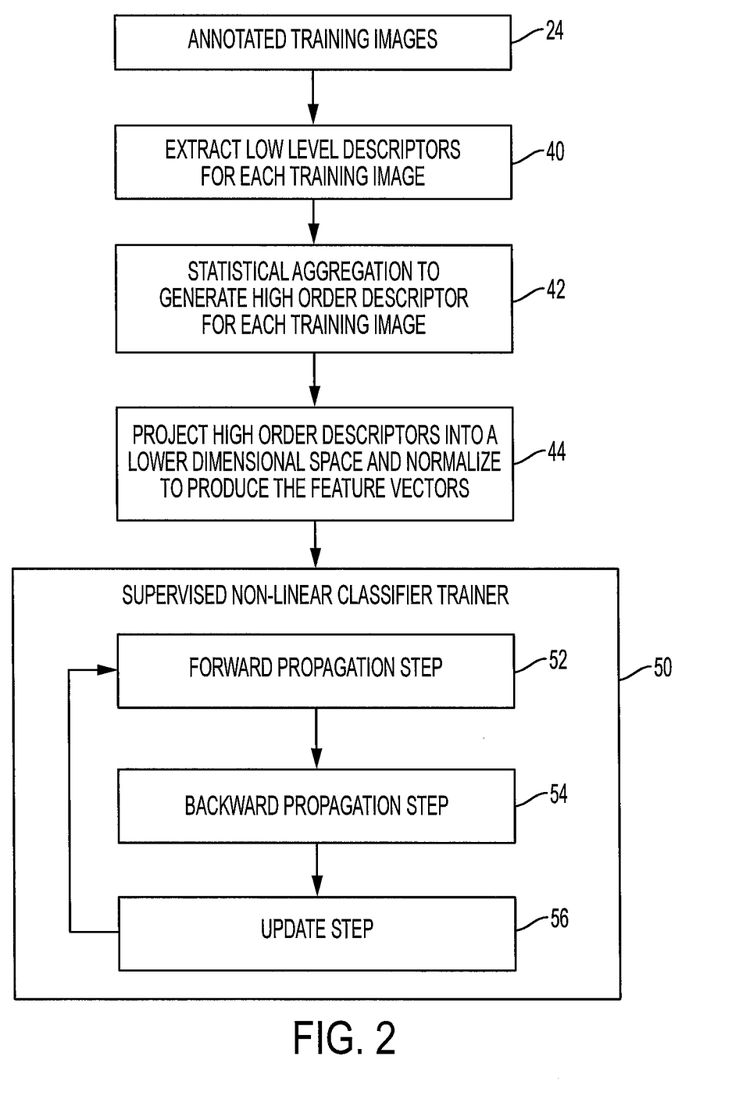
FIG. 2 shows a flowchart of a training process for training the BoP/NN image classifier of FIG. 1.

With continuing reference to FIG. 1 and further reference to FIG. 2, a method of training the BoP/NN classifier 10 is described. In an operation 40, the low level descriptors are extracted from each patch of each training image of the set of training images 24. This is the unsupervised operation $u_1$ of the illustrative BoP/NN classifier 10. In an operation 42, statistical aggregation is applied to generate a higher order descriptor for each training image, corresponding to operation $u_2$ of the classifier 10. While a FV framework is employed in the illustrative classifier 10, in other embodiments other generative models may be used to encode the local descriptors extracted from each patch, and the resulting encoded descriptors are aggregated, e.g. concatenated to form a first image-level feature vector. In an operation 44, PCA/whitening or another dimensionality reducing technique is applied to project the high order descriptors into a lower dimensional space, preferably with low inter-dimensional correlations as is provided by PCA. This corresponds to unsupervised operation $u_3$ of illustrative classifier 10. Each of the operations 42, 44 optionally also includes normalization, such as an $l_2$-normalization. The resulting training image feature vectors are then used in a NN training operation 50. The training 50 updates the supervised layers $s_1, \ldots, s_L$ for each iterative pass of the training. The training optimizes the adjustable weights of the neurons to minimize the loss. The illustrative supervised non-linear classifier trainer 50 employs a typical backpropagation neural network training procedure, which iteratively applies: a forward propagation step 52 that generates the output activations at each layer, starting from the first layer and finishing with the last layer; a backward propagation step 54 that computes the gradients, starting from the last layer and finishing with the first layer; and an update step 56 that updates the weight parameters of each layer of the NN 22.

Figure 3:
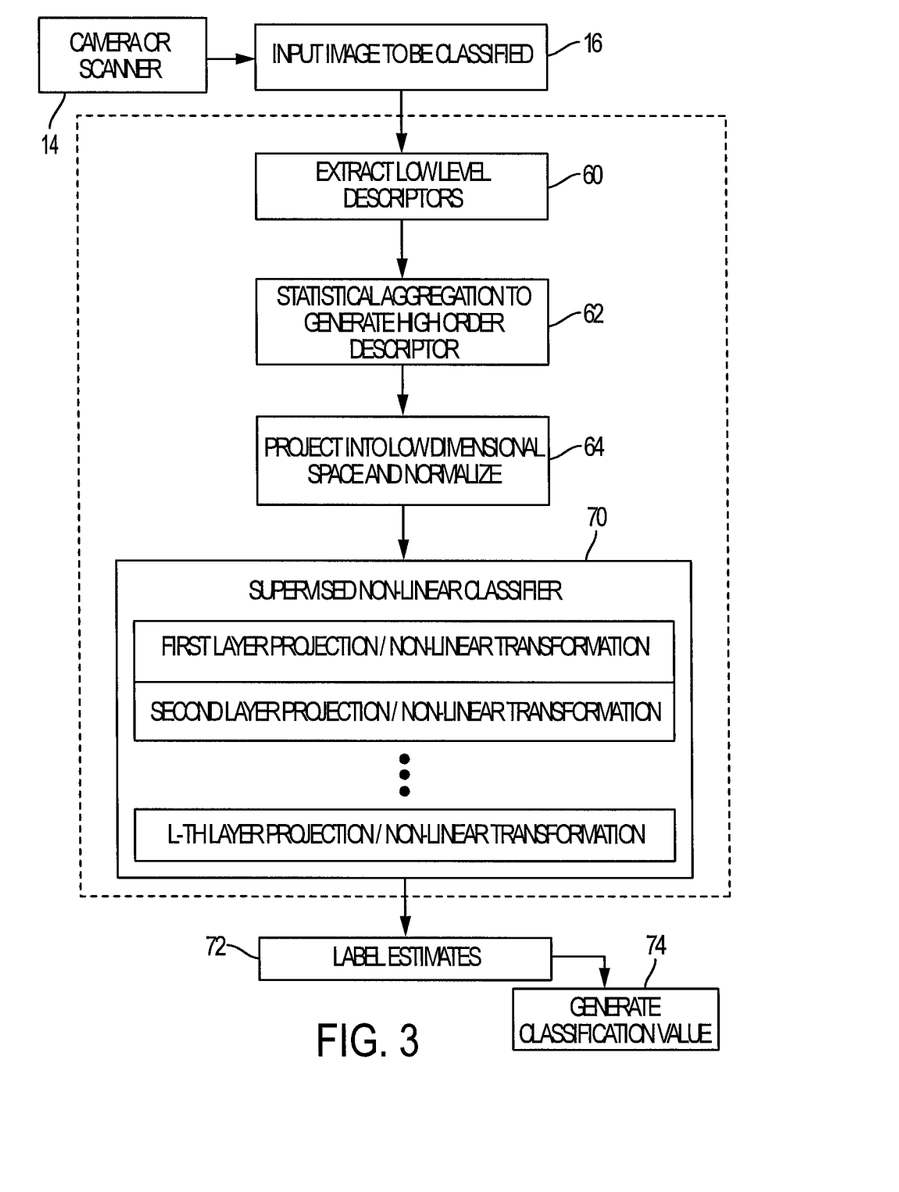
FIG. 3 shows a flowchart of an image classification process performed using the BoP/NN image classifier of FIG. 1 after training in accordance with the training process of FIG. 2.

With continuing reference to FIG. 1 and further reference to FIG. 3, use of the BoP/NN classifier 10 is described. The camera 14 acquires the input image 16, which is then processed by unsupervised operations 60, 62, 64 which correspond to operations 40, 42, 44 respectively of the training process of FIG. 2 (and to operations $u_1$, $u_2$, $u_3$ respectively of FIG. 1) except that they are applied to the input image 16. The resulting input image feature vector is then input to the NN 22 in an operation 70 where, as per the feed-forward NN architecture, the ordered sequence of supervised layers $s_1, \ldots, s_L$ is applied in sequence, starting with layer $s_1$ and continuing through to layer Sl, which outputs label estimates 72 (corresponding to the vector $x_L$ of FIG. 1). (The operation 70 of FIG. 3 suitably corresponds to the forward propagation step 52 of the neural network training 50 of FIG. 2 performed using the optimized neuron weights output by the neural network training). The label estimates 72 may be the final classification value output by the system, or alternatively an additional post-classifier operation 74 may be performed to generate the classification value. For example, the post-classifier operation 74 may include selecting the label having the highest label estimate, or applying thresholding to the label estimates to select a sub-set of highest-ranked labels, or so forth.

In the following, some further aspects and illustrative examples of the unsupervised operations (e.g. layers $u_1$, $u_2$, $u_3$ of FIG. 1) are described.

The local feature extraction layer $u_1$ can in general employ any choice of local descriptors. In some illustrative examples, SIFT and color descriptors are employed, but additional and/or other local descriptors can be included. In an illustrative approach, the images are resized to 100,000 pixels while maintaining the aspect ratio (so that no stretch-type distortion is introduced). An illustrative patch extraction is as follows: extract 24×24 patches every 4 pixels at 5 scales thus leading to approximately 10,000 patches per image. From each patch two types of local descriptors are extracted: 128-dim SIFT descriptors and 96-dim Local Color Statistics (LCS). Their dimensionality is reduced with PCA to 77-dim and 45-dim, respectively. The xy coordinates and the scale of the patches is concatenated to these descriptors, thus yielding 80-dim and 48-dim descriptors.

Illustrative examples of the FV encoding layer ($u_2$) are next described. The illustrative encoding follows the FV formulation of Perronnin and Dance, "Fisher kernels on visual vocabularies for image categorization" in CVPR (2007) and Perronnin et al., "Improving the fisher kernel for large-scale image classification", ECCV (2010). A generative model is used in the form of a Gaussian Mixture Model (GMM) with K Gaussian components whose parameters are $\lambda = \{w_k, \mu_k, \sigma_k, k=1 \ldots K\}$ where $w_k$, $\mu_k$, and $\sigma_k$ denote respectively the mixture weight, mean vector and standard deviation vector of Gaussian k (assuming a diagonal covariance). In the FV framework, the D-dim descriptor x is embedded with a function $\Phi(x)=[\phi_1, \ldots, \phi_K(x)]$ into a 2KD-dim space where each function $\phi_k(x): \mathbb{R}^D \to \mathbb{R}^{2D}$ is defined by:

$$\varphi_k(x) = \left[ \frac{\gamma(k)}{\sqrt{w_k}} \left( \frac{x-\mu_k}{\sigma_k} \right), \frac{\gamma(k)}{\sqrt{2w_k}} \left( \frac{(x-\mu_k)^2}{\sigma_k^2} - 1 \right) \right] \quad (1)$$

where $\gamma(k)$ denotes the soft assignment of descriptor x to Gaussian k. The illustrative examples employ a GMM with 1,024 Gaussian components. The per-patch FVs are aggregated with sum-pooling, square-rooted and $l_2$-normalized. One FV is computed on the SIFT descriptors and one on the LCS descriptors. The two FVs are concatenated into a 256K-dim representation. It will be appreciated that this is merely an illustrative example, and other generative models may be employed to generate the higher order descriptor.

Illustrative examples of the dimensionality reduction layer ($u_3$) are next described. The FVs are high-dimensional which increase both memory and computational complexity. To reduce both, the illustrative operation $u_3$ employs a PCA dimensionality reduction followed by whitening and $l_2$-normalization. In experiments reported herein, the dimensionality of the FVs is reduced from 262,144 dimensions down to 4,096 dimensions.

Some experiments were also performed which omitted the dimensionality reduction operation $u_3$ so that the FV's output by operation $u_2$ were fed directly to the NN 22. Results with this approach were not as good as compared to the approach including the dimensionality reduction operation $u_3$. Without being limited to any particular theory of operation, it is believed that this may be due to the high computational cost incurred by dealing with 256K-dim vectors which limited exploration of the parameter space.

The unsupervised operations (layers) $u_1$, $u_2$, $u_3$ are not trained using supervised learning that utilizes labels (i.e. annotations) of the set of training images 24. Rather, the layers unsupervised operations (layers) $u_1$, $u_2$, $u_3$ are learned in an unsupervised fashion (e.g. analogous to unsupervised clustering of unlabeled examples). A significant advantage of unsupervised learning is that the parameters can be learned on a representative set of unlabeled images, and thereafter serve as universal parameters that do not need to be retrained for a specific task represented by example annotations (labels). In illustrative examples reported herein, the unsupervised learning was performed on a subset of 10,000 images of the ImageNet Large Scale Visual Recognition Challenge year 2010 (ILSVRC '10) training set. The PCA reduction of the local descriptors and the GMM were learned on a sub-sample of one million local descriptors randomly extracted from these 10,000 images. Given that the number of training images was smaller than the FV dimensionality (10,000<262,144), the PCA reduction of the FV was learned in the dual.

Next, some further aspects and illustrative examples of the supervised operations (e.g. layers $s_1, \ldots, S_L$ of FIG. 1) making up the NN 22 are described. The PCA-reduced FVs output by the last unsupervised layer ($u_3$) are input to the first supervised layer ($s_1$).

The NN 22 comprises a set of L fully connected layers each of which comprises a linear projection followed by a non-linear transform. Denoting as $x_{n-1}$ the input of layer ($s_n$) and denoting as $x_n$ the output of layer ($s_n$), and further denoting as $\sigma_n$ the non-linearity of the non-linear transform of layer ($s_n$), the processing introduced by layer ($s_n$) can be written as:

$$x_n = \sigma(F_n(x_{n-1})) \quad (2)$$

where $F_n(x)=W_n x+b_n$ denotes the linear projection of layer ($s_n$) and $W_n$ and $b_n$ are parameters to be learned. For the intermediate hidden layers ($s_1$) to ($s_{L-1}$), the non-linear transform $\sigma$ is a rectified Linear Unit (reLU) non-linearity:

$$\sigma_n(x)=\max(0,x), n=1, \ldots, L-1 \quad (3)$$

For the last layer ($s_L$), in the mono-label case the non-linearity $\sigma_L$ was implemented as a softmax non-linearity, which for an input vector $x=[x(1), \ldots, x(E)]$ performs the following transformation:

$$x(e) \to \frac{\exp(x(e))}{\sum_{i=1}^{E} \exp(x(i))}. \quad (4)$$

This choice for $\sigma_L$ ensures that the output scores (i.e. vector $x_L$ in FIG. 1) are non-negative and sum to unity and thus provides a probabilistic-like output. In the multi-label case, the following sigmoid non-linearity was employed:

$$x(e) \rightarrow \frac{1}{1+\exp(-x(e))}. \quad (5)$$

This choice for $\sigma_L$ enables multiple output classes to have strong activations (close to 1). In experiments reported herein, the number L of supervised layers varying from L=1 to L=4 (that is, 0 to 3 hidden supervised layers).

The parameters of the supervised layers $s_1, \ldots, s_n$ were learned using supervised learning which utilizes labels (i.e. annotations) of the set of training images 24. The supervised learning was respective to an objective that minimized the cross-entropy between the output of the NN 22 and the ground-truth defined by the labels of the training set 24. In notation used herein, N denotes the number of labeled training images, and label $y_{n,c}=1$ if image n is tagged with class label c and $y_{n,c}=0$ otherwise. Further denote by $\hat{y}_{n,c}$ the prediction of label c for image n as output by the last supervised layer ($s_L$). In the mono-label case, the supervised training maximizes:

$$\sum_{n=1}^{N}\sum_{c=1}^{C} y_{n,c}\log(\hat{y}_{n,c}) \quad (6)$$

while in the multi-label case, the training maximizes:

$$\sum_{n=1}^{N}\sum_{c=1}^{C} y_{n,c}\log(\hat{y}_{n,c}) + (1-y_{n,c})\log(1-\hat{y}_{n,c}) \quad (7)$$

In experiments reported herein, the weights were initialized from a zero-mean Gaussian. For the optimization, back-propagation 52 was employed with mini-batch stochastic gradient descent and a batch size of 128. The learning rate was fixed during an iteration (one pass over the data). When the iteration-to-iteration validation error decreased by less than 0.1%, the step-size was divided by 10. This procedure was repeated twice so as to have three learning rates. The starting step-size was cross-validated in the experiments. To avoid over-fitting, drop-out was used at the input of all supervised layers, with the same drop-out rate used for all layers (although it is contemplated that using different values might improve results).

It is emphasized that the foregoing are merely illustrative examples, and numerous variants are contemplated, such as using different or additional low level features, using different generative models in the unsupervised operation $u_2$, omitting or modifying the dimensionality reduction, employing different non-linearities (i.e. different σ transforms) in the hidden supervised layers and/or in the final supervised layer ($s_L$), or so forth.

An advantage of the BoP/NN image classifier 10 over a conventional BoP classifier employing a linear kernel is that the non-linearity of the supervised layers (i.e. the NN 22) enables operation with fewer features. The capacity of a linear classifier is the feature dimensionality+1. Thus, in a conventional BoP classifier employing a linear kernel, high-dimensional features are advantageous to obtain a high enough capacity. By contrast, by using the non-linear NN 22 the capacity is not constrained by the dimensionality of the features vector that enters the supervised layers 22.

An advantage of the BoP/NN image classifier 10 over a conventional CNN image classifier is that the unsupervised layers 20 that input to the NN 22 are trained by unsupervised learning that does not make use of labels of the training images (or can use unlabeled training images), whereas the convolutional layers of a CNN classifier require supervised learning on training images that are labeled with respect to the intended classification task. In the BoP/NN classifier 10, the learning of the first layers 20 can be viewed as an unsupervised pre-training stage. Since these layers 20 do not need to be re-trained for each task, the BoP/NN classifier 10 is fast to train. As a corollary, multiple models can be efficiently trained, starting from different random initializations, for bagging purposes as the unsupervised layers 20 are learned once and can be re-used for each bag. Also, it is noteworthy that typically the cost of forward-passing an image through the unsupervised layers 20 (or, through the supervised convolutional layers of a conventional CNN) is much higher than the cost of forward-passing through the supervised neural network layers (by a factor ~100). Hence, with the BoP/NN image classifier 10, at inference time when bagging multiple models, the costly processing of the initial unsupervised layers 20 can be performed only once, with the resulting vector denoted $x_0$ in FIG. 1 being re-used for each bag classifier, with only the pass of the (same) input image feature vector $x_0$ through the supervised layers being repeated for each bag of the bagging classifier.

A potential limitation of the disclosed BoP/NN image classifier 10 is that the unsupervised layers 20 are not tuned to a specific task, and hence might be expected to perform much worse than the convolutional layers of a conventional CNN image classifier which are trained in a supervised fashion. However, experiments reported herein demonstrate that the unsupervised layers 20 provide results that are competitive with state-of-the-art CNN image classifiers as measured by a number of benchmarks.

It may be unpractical to collect large numbers of labeled images for each new computer vision task. This difficulty can be alleviated by transferring mid-level features learned by the BoP/NN classifier 10. Transferring mid-level features derived from the outputs of intermediate NN layers (that is, features generated by intermediate or hidden layers of the NN 22, that is, from one of the layers $s_1, \ldots, s_{L-1}$) to different class sets or to new tasks (e.g. for image retrieval or object detection). Such a transfer is performed as follows. Given a new image, a forward pass through the unsupervised layers 20 and the supervised layers 22 is performed, and the output of one of the intermediate supervised layers $s_1, \ldots, s_{L-1}$ is extracted. This output may be normalized, for example using $l_2$-normalization. It also possible to use the output of multiple intermediate layers, to $l_2$-normalize them and to concatenate them. Experiments reported herein (for output of a single hidden layer) show that mid-level features derived from the hidden layers of the NN 22 are competitive with those derived from CNN architectures for these purposes.

In the following, experiments are reported for embodiments of the BoP/NN image classifier 10, along with other "baseline" image classifiers tested for comparison. The experiments were performed using images obtained from the ILSVRC '10 images dataset. Further experiments demonstrate that intermediate level features from the hidden supervised layers can be extracted for use in classification and retrieval.

The ILSVRC '10 images dataset contains 1.4 million images labeled with respect to 1,000 classes. In the experiments reported herein, 1.2 million images were used for training, 50,000 images were used for validation, and 150,000 images were used for testing. The challenge training/validation/test protocol and evaluation measure was followed, i.e. the top-5 error rate.

Influence of the FV dimensionality reduction layer $u_3$ was first quantified. In this experiment, a single supervised layer was used for classification, i.e. a linear logistic classifier. Where dimensionality reduction was omitted, PQ was used to reduce the memory footprint of the 256K-dim FVs. Using a standard setting in which the FV was divided into sub-vectors of 8 dimensions and 8 bits per sub-vector, a 25.5% top-5 error was obtained. When performing the dimensionality reduction using PCA to 4K-dim, 27.2% was obtained which is only 1.7% higher. However, a major advantage of the dimensionality reduction layer $u_3$ is that it significantly speeds-up subsequent computations in supervised layers 22.

Experiments were performed to study the influence of two key parameters which control the complexity of the supervised layers 22: the number of supervised layers (i.e. the value L) and the number of units per layer. (In all the following experiments, the number of units was kept fixed across hidden layers.) As more complex models might more easily overfit, the influence of these two parameters was studied jointly with the drop-out rate.

Figure 4A:
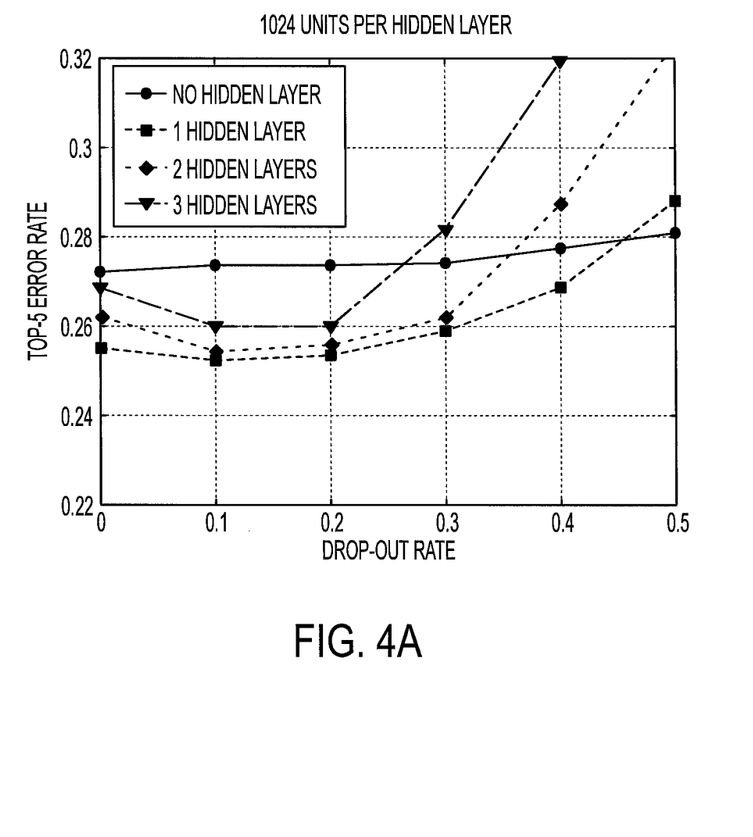
Figure 4B:
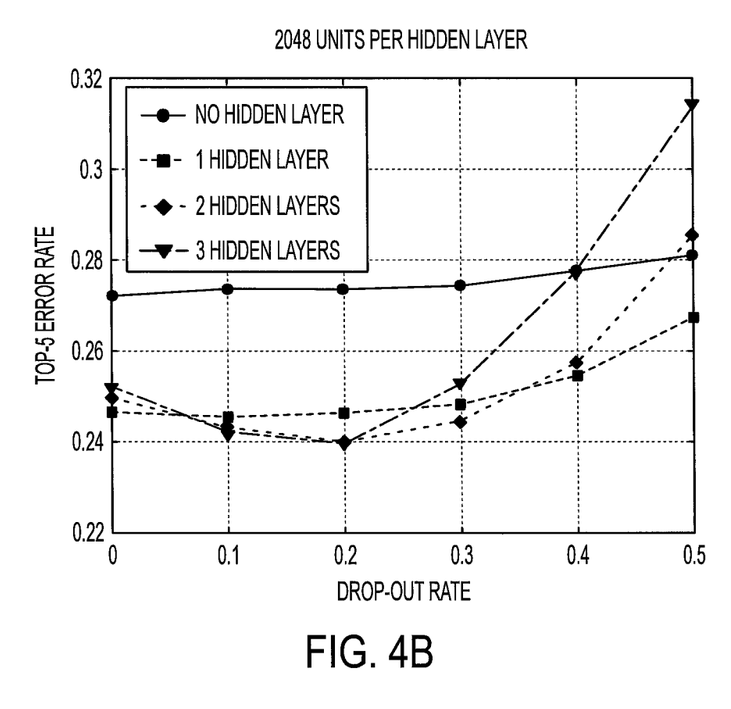
Figure 4C:
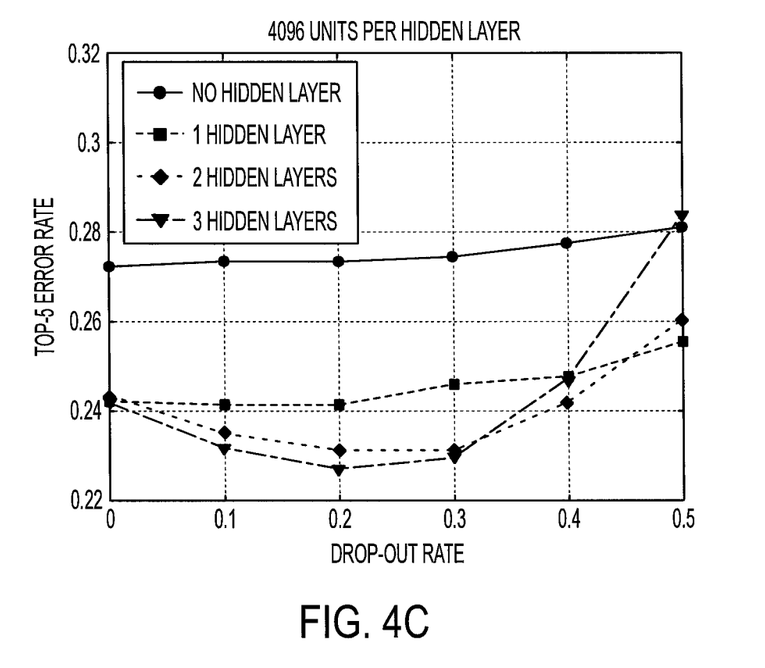

FIGS. 4A, 4B, and 4C summarize results of these experiments. Top-5 error is plotted as a function of the drop-out rate for a variable number of hidden layers and a variable number of hidden units per layer (always the same number of units in each hidden layer). The top plot is for 1,024 units per hidden layer. The middle plot is for 2,048 units per hidden layer. The bottom plot is for 4,096 units per hidden layer. It is seen here that drop-out does not help when training a linear classifier (i.e., no hidden layer), because here the classifier operates on low-dim descriptors (4K) and therefore there is little opportunity to overfit. The optimal drop-out seems to be around 0.2 for NN's with hidden layers, regardless of the number of hidden layers and the number of units. Furthermore, more hidden layers does not seem to help for too small a number of hidden units, as seen in the upper plot of FIGS. 4A, 4B, and 4C. However, more hidden layers does make a difference for a larger number of units, as seen in the lower plot of FIGS. 4A, 4B, and 4C, and the performance saturates with 3 hidden layers (L=4).

Further experiments compared the BoP/NN image classifier 10 with conventional BoP image classifiers employing linear kernel classifiers including the arc-cosine kernel and the Radial Basis Function (RBF) kernel. Because of the large number of training samples (1.2M), the non-linear kernel classifiers were trained in the primal by leveraging explicit feature maps. In the arc-cosine kernel case, the feature map involved a random Normal projection followed by a reLU non-linearity. In the RBF kernel case, a feature map was used which involves a random Normal projection, a random offset and a cosine non-linearity. The kernel bandwidth of the RBF was cross-validated.

Figure 5:
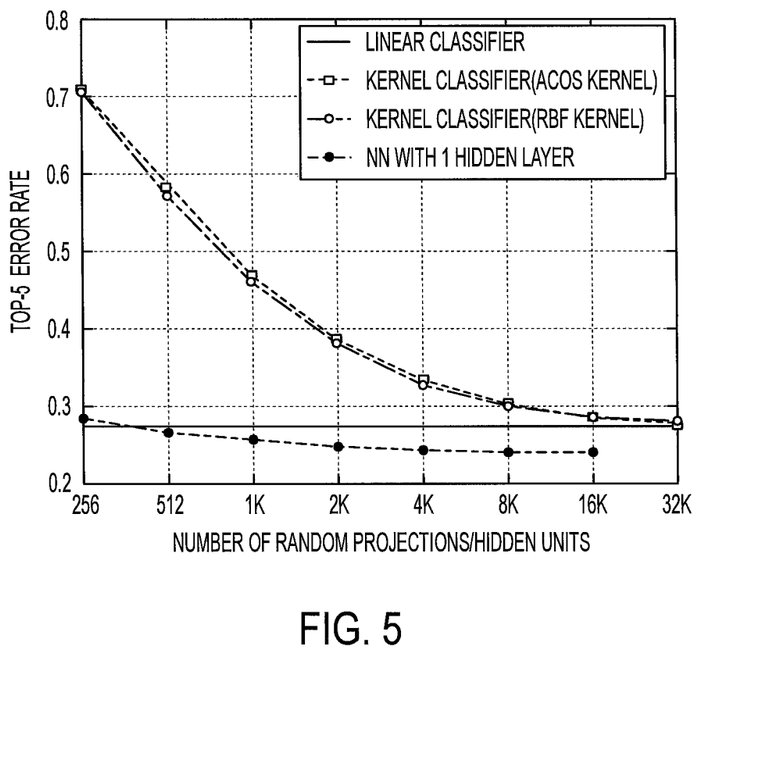

FIG. 5 presents results as a function of the dimensionality of the feature map (for the arc-cosine and RBF kernels) and of the number of units in the hidden layer (in the NN case, where "linear classifier" corresponds to no hidden layer). The arc-cosine and RBF kernels perform similarly and significantly worse than a NN with one hidden layer, especially for a small number of random projections/hidden units. Just to perform on par with the linear baseline (NN with no hidden layer), both the arc-cosine and RBF kernels need to project the original samples in a 32K-dim space (8 times larger than the original 4K-dim features). While it might be possible to obtain better results with these kernels by projecting in even higher dimensional spaces, this is more computationally costly than the BoP/NN solution disclosed herein.

Figure 6:
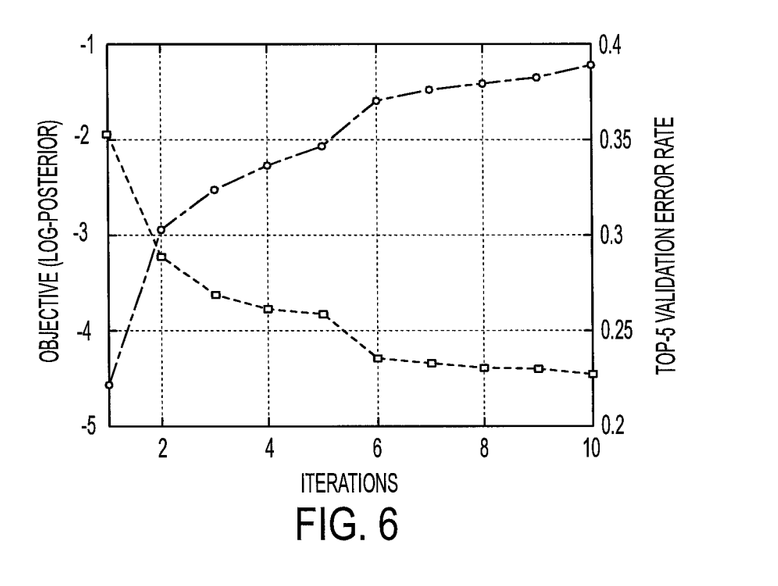

With reference to FIG. 6, convergence is next considered. FIG. 6 plots the evolution of the objective as well as the validation accuracy over the iterations when learning a model with three hidden supervised layers with 4,096 units and a drop-out rate of 0.2 (the best results reported in FIG. 4). It is observed that the convergence is fast. Without being limited to any particular theory of operation, it is believed that this is because the first layers of the BoP/NN architecture are pre-trained in an unsupervised manner and are kept fixed during the supervised learning process, thus reducing the number of parameters to be learned. Running 24 threads on a Linux server with Intel® Core™ i5-2400 CPUs at 3.10 GHz and 128 GB of RAM, a pass over the data is carried out in about one hour with a C++ implementation. Hence, the whole training process takes about ten hours on a single server. Using multiple servers, it is possible to train in parallel multiple models from different initializations and to bag their outputs.

Figure 7:
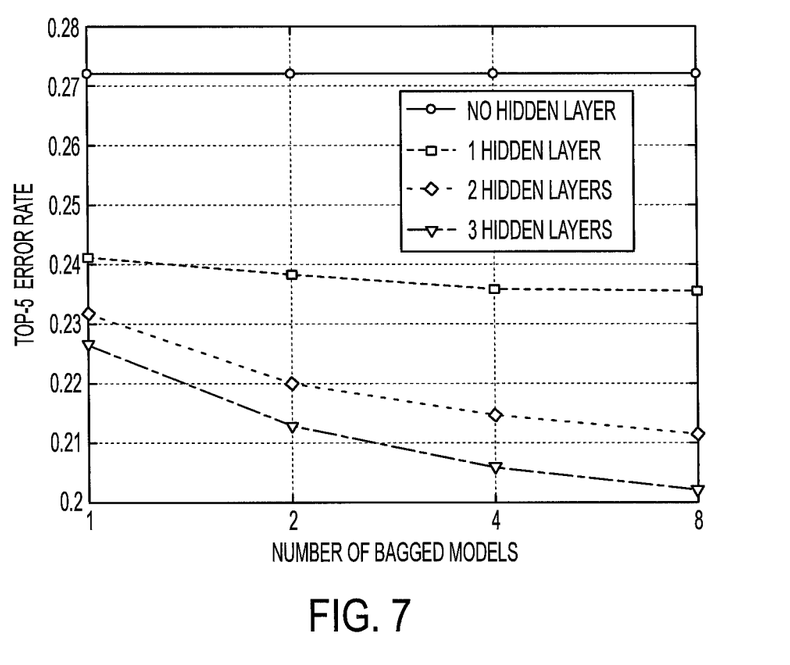

With reference to FIG. 7, bagging implementation is next considered, for BoP/NN architectures with 0, 1, 2 and 3 hidden supervised layers. For each architecture, 8 different models were trained using different random seed initializations. To combine the output of multiple networks, the probabilistic outputs were multiplied. Results are presented in FIG. 7 when combining 2, 4 or 8 models. As seen in FIG. 7, the larger the number of hidden layers, the greater the impact of bagging. When there is no hidden supervised layer the objective to be optimized is convex and therefore different initializations lead to the same solution. The larger the number of hidden layers, the greater the opportunity for the different models to converge to different solutions. In the case of 3 hidden layers, the improvement is from a top-5 error rate of 22.6% with no bagging to 20.2% with bagging.

In the next reported experiments, data augmentation is considered. A standard way to avoid overfitting when training classifiers, especially those with deep architectures, is to artificially augment the data by introducing transformed versions of the original images. To avoid manually choosing the transformations, the Iterative Transformation Pursuit (ITP) algorithm was run on a subset of ILSVRC '10 (using all 1,000 classes but only 30 images per class) and a set of 4 transformations was chosen on top of the original images. Hence, the number of images is multiplied by a factor of five. Data augmentation was used both at training and test time. At test time, the predictions were multiplied corresponding to the different transformations of the images. In the case of no hidden supervised layer (that is, a linear classifier is learned on top of the 4,096-dim PCA-reduced FVs), the error rate was decreased from 27.2% with no data augmentation to 25.2% with data augmentation. The results in the case of three hidden supervised layers is reported in Table 1.

TABLE 1

Impact of augmentation and bagging on BoP/NN image classifier with three hidden layers

| # of hidden units | Data aug? | Bagging? | Top-5 error (%) |
|---|---|---|---|
| 4,096 | No | No | 22.6 |
| 4,096 | No | Yes | 20.2 |

TABLE 1-continued

Impact of augmentation and bagging on
BoP/NN image classifier with three hidden layers

| # of hidden units | Data aug? | Bagging? | Top-5 error (%) |
|---|---|---|---|
| 4,096 | Yes | No | 19.8 |
| 4,096 | Yes | Yes | 18.1 |
| 8,192 | Yes | Yes | 17.6 |

As seen in the last line of Table 1, the best results were obtained using three hidden supervised layers (L=4) with 8,192 hidden units/layer, with data augmentation (original image plus four transformations) and bagging of eight models. This provided a top-5 error rate of 17.6%. This result better than that obtained with other techniques, except for a tested CNN image classifier that provided a slightly better top-5 error rate of 17.0%. (However, the CNN image classifier suffers certain deficiencies overcome by the BoP/NN image classifier 10, such as sensitivity to possible image distortion caused by stretching the image to match the aspect ratio of training images, and lack of geometric invariance, among others).

The BoP/NN image classifier 10 was also benchmarked on ILSVRC '12 data (from year 2012). This dataset contains 1,000 classes, ~1.2 million training images, and 50,000 validation images. Using the BoP/NN image classifier with training set augmentation (original image+8 transformations selected with ITP) and bagging 8 models, three hidden supervised layers with 8,000 hidden units/layer and a 0.2 drop-out rate in all supervised layers, a top-5 error rate of 19.8% was obtained. This was better than values reported in the literature for conventional BoP image classifiers using linear kernels, but not as good as several reported CNN image classifiers, one of which has been reported to provide a top-5 error rate of as low as 7.5%. However, CNN classifiers typically take on the order of weeks to train on a high performance GPU, whereas the BoP/NN classifier used for the ILSVRC '12 benchmark was trained in 10 days on a small CPU cluster of eight machines.

Further experiments were performed to show that the BoP/NN image classifier effectively outputs mid-level features from intermediate (hidden) layers of the NN 22. A BoP/NN image classifier learned on ILSVRC '12 data with three hidden supervised layers with 4,096 units/layer and a drop-out rate of 0.2 was tested, and it was studied how this BoP/NN image classifier transferred to new tasks for which less training data was available. Both classification and instance retrieval tasks were considered.

Classification experiments were conducted on PASCAL VOC '07 and VOC '12 data which contain 20 classes. VOC '07 is split into 2,501 training, 2,510 validation and 4,952 test images. VOC '12 is composed of 5,717 training, 5,823 validation, and 10,991 test images. Following the PASCAL guidelines, a study was conducted on VOC '07 and a single run on VOC '12 is reported (evaluated on the PASCAL server). On both datasets, the mean Average Precision (mAP) over the 20 classes is reported.

The transfer strategy was to extract the output of the penultimate layer ($x_{L-1}$ in the experiments), $l_2$-normalizing it and feeding it to a classifier. Both linear and non-linear classifiers were considered. In the non-linear case, to stay in the spirit of the BoP/NN architecture, a NN was learned with fully connected layers, reLU non-linearities for the hidden layers and sigmoid non-linearities for the last layer. The number of layers, the number of hidden units and the drop-out rate were cross-validated. Since there are a limited amount of labeled training VOC images, data augmentation is used on VOC too. To this end, ITP was applied to select a set of four transformations (on top of the original images), which were applied at training and test time. The ITP learning was done on the training and validation sets using a linear classifier. The same chosen transformations were used in both the linear and non-linear cases. The possibility of bagging the systems obtained with multiple pre-trained systems (8 in our experiments) was also considered.

Results are shown in Table 2. As observed for ILSVRC '10, non-linear classifiers improve over linear ones despite the limited amount of training data. Data augmentation and bagging helped in all experiments in which they were applied. The best obtained result of 76.2% mAP was obtained by bagging 8 classifiers with 3 hidden layers (2K units per layer). Compared with literature reports, this result is better than results reported for BoP image classifiers using linear kernels (around 63-68% mAP), and comparable with reported results for more computationally costly CNN image classifiers (around 73.4% to 82.4% mAP).

TABLE 2 mAP on VOC'07 for linear versus
non-linear classifiers, with/without data
augmentation and with/without bagging

| Classifier | Data aug? | Bagging? | mAP (%) |
|---|---|---|---|
| Linear | No | No | 71.1 ± 0.12 |
| Linear | Yes | No | 72.9 ± 0.19 |
| Linear | Yes | Yes | 74.5 |
| Non-linear | No | No | 73.1 ± 0.13 |
| Non-linear | Yes | No | 74.8 ± 0.25 |
| Non-linear | Yes | Yes | 76.2 |

Experiments were also performed to consider application of mid-level features from the NN 22 of the BoP/NN image classifier 10 for instance retrieval. Two datasets were considered: INRIA Holidays ("Holidays") which includes 1,491 images of 500 scenes; and the University of Kentucky Benchmark ("UKB") which includes 10,200 images of 2,250 objects. The following standard evaluation measures were computed: mean AP (mAP) for Holidays and 4 times the recall at top 4 on UKB. In the experiments, the output of intermediate layers was extracted and $l_2$-normalized, and compared with the dot-product. In general, it is expected that the transferability of features should decrease as the distance between the base and target tasks increases. For UKB, the $x_2$ intermediate layer output was extracted, while for Holidays the $x_1$ intermediate layer output was extracted. Results for two baselines were also considered: (1) using the high-dimensional FVs; and (2) using the PCA-reduced FVs (i.e. $x_0$). Bagging in this context can be done by fusing the scores of multiple queries. However, the query cost of this late fusion strategy increases linearly with the number of models. Instead, in the performed experiments the representations produced by the different models were concatenated, and the dimension of this new representation was reduced with PCA-whitening learned on ILSVRC '10.

TABLE 3

Retrieval results on Holidays and UKB
where $x_*$ indicates the output of
the best intermediate layer was used

| Method | FV | $x_0$ | $x_*$ | Bag-8 + PCA | |
|---|---|---|---|---|---|
| Dimensions | 256K | 4K | 4K | 512 | 4K |
| Holidays | 82.4 | 83.5 | 80.5 ± 0.31 | 82.7 | 84.7 |
| UKB | 3.35 | 3.33 | 3.36 ± 0.01 | 3.37 | 3.43 |

Table 3 reports the results. It is observed that the PCA-reduced FVs obtain very competitive results and that using the best intermediate layer leads to a decrease of performance on Holidays and to only a slight increase on UKB. However, the proposed bagging strategy, that involves PCA and whitening, leads to improvements with a competitive result of 84.7% (resp. 3.43) reported on Holidays (resp. UKB) for 4K dimensions. These results are comparable with those reported in the literature using more computationally costly CNN image classifiers.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system comprising:
  a computer programmed to perform an image classification method including the operations of:
    generating a feature vector representing an input image by unsupervised operations including extracting local descriptors from patches distributed over the input image, encoding the local descriptors extracted from each patch using a Fisher vector encoding, and aggregating the encoded local descriptors to form a vector; and
    generating a classification value for the input image by applying a neural network (NN) comprising an ordered sequence of layers to the feature vector wherein each layer of the ordered sequence of layers is applied by performing operations including a linear vector projection and a non-linear vector transformation.

2. The system of claim 1 wherein the unsupervised operation of extracting the feature vector includes the further operation of:
  projecting the vector formed by the aggregating into a space of lower dimensionality than the dimensionality of the vector formed by the aggregating to produce a feature vector of lower dimensionality.

3. The system of claim 2 wherein the unsupervised operation of projecting the vector formed by the aggregating into a space of lower dimensionality is performed using Principal Component Analysis (PCA).

4. The system of claim 2 wherein the unsupervised operation of extracting the feature vector includes the further operation of:
  normalizing the feature vector of lower dimensionality to produce the feature vector representing the input image.

5. The system of claim 1 wherein the computer is further programmed to perform the operation of generating a set of mid-level features representing the input image as the output of an intermediate layer of the ordered sequence of layers that is not the last layer of the ordered sequence of layers.

6. A system comprising:
  a computer programmed to perform an image classification method including the operations of:
    generating a feature vector representing an input image by unsupervised operations including extracting local descriptors from patches distributed over the input image; and
    generating a classification value for the input image by applying a neural network (NN) comprising an ordered sequence of layers to the feature vector wherein each layer of the ordered sequence of layers is applied by performing operations including a linear vector projection and a non-linear vector transformation;
  wherein the computer is further programmed to perform an image classifier training method comprising the operations of:
    for each training image of a set of training images, generating a training image feature vector representing the training image by the same unsupervised operations that generate the feature vector representing the input image; and
    training the neural network (NN) on a training set comprising the generated training image feature vectors annotated by labels of the represented training images.

7. The system of claim 6 wherein the unsupervised operations are not trained using supervised learning that utilizes labels of the set of training images.

8. The system of claim 6 further comprising:
  a camera arranged to acquire the input image as an image of a person or vehicle to be classified;
  wherein the set of training images comprise a set of training images of persons or vehicles, the labels of the training images are labels of the persons or vehicles imaged by the training images, and the classification value for the input image that is generated by the image classification method is effective to classify the person or vehicle to be classified respective to a classification scheme of which the labels of the training images are examples.

9. The system of claim 8 wherein:
  the computer is programmed to perform the image classification method on a plurality of input images imaging a plurality of persons or vehicles to be classified to generate to classification values for respective persons or vehicles of the plurality of persons or vehicles to be classified; and
  the computer is further programmed to perform a traffic monitoring process operating on the generated classification values.

10. The system of claim 6 further comprising:
  a document scanner configured to acquire the input image as an image of a printed page to be classified;
  wherein the set of training images comprise a set of training images of printed pages, the labels of the training images are labels of the printed pages imaged by the training images, and the classification value for the input image that is generated by the image classification method is a page classification value that classifies the printed page to be classified.

11. The system of claim 10 wherein:
  the computer is programmed to perform the image classification method on a plurality of input images imaging a plurality of printed pages to be classified to generate to page classification values for respective printed pages of the plurality of printed pages to be classified; and
  the computer is further programmed to perform an electronic document sorting method on the input images of the plurality of printed pages to be classified using the generated page classification values.

12. A non-transitory storage medium storing instructions readable and executable by a computer to perform an image characterization method including the operations of:
generating a feature vector representing an input image by unsupervised operations including:
(i) extracting local descriptors from image patches,
(ii) encoding the local descriptors extracted from each image patch using a generative model,
(iii) aggregating the encoded local descriptors to form a first vector,
(iv) performing dimensionality reduction on the first vector to form a second vector of lower dimensionality than the first vector, and
(v) performing a normalization operation on the second vector to generate the feature vector; and
applying a supervised classifier comprising an ordered sequence of layers wherein each layer includes at least one non-linear vector transformation operation and:
(I) the first layer of the ordered sequence of layers operates on the feature vector,
(II) each layer after the first layer operates on the output of the immediately preceding layer of the ordered sequence of layers, and
(III) the image characterization value comprises or is generated from the output of a selected layer of the ordered sequence of layers.

13. The non-transitory storage medium of claim 12 wherein the unsupervised operation (ii) comprises encoding the local descriptors extracted from each image patch as a Fisher vector and the operation (iii) comprises concatenating the Fisher vectors of the image patches to form the first vector.

14. The non-transitory storage medium of claim 13 wherein the unsupervised operation (iv) comprises performing Principal Component Analysis (PCA) on the first vector to form the second vector of lower dimensionality than the first vector.

15. The non-transitory storage medium of claim 12 wherein the supervised classifier comprises a neural network comprising the ordered sequence of layers.

16. The non-transitory storage medium of claim 12 further storing instructions readable and executable by a computer to perform an image classifier training method including the operations of:
for each training image of a set of training images, generating a training image feature vector representing the training image by performing the unsupervised operations (i)-(v); and
training the supervised classifier on a training set comprising the generated training image feature vectors annotated by labels of the represented training images.

17. The non-transitory storage medium of claim 16 wherein the non-transitory storage medium does not store instructions readable and executable by a computer to train the unsupervised operations (i)-(v) using supervised learning that utilizes labels of the set of training images.

18. The non-transitory storage medium of claim 12 wherein the image characterization value comprises a set of mid-level features representing the input image generated as the output of a layer of the ordered sequence of layers that is not the last layer of the ordered sequence of layers.

19. The non-transitory storage medium of claim 12 wherein the image characterization value comprises an image classification value generated by the last layer of the ordered sequence of layers.

20. A system comprising:
a non-transitory storage medium as set forth in claim 12;
a camera arranged to acquire the input image as an image of a person or object to be classified; and
a computer operatively connected with the camera to receive the input image from the camera and operatively connected with the non-transitory storage medium to read and execute the instructions stored on the non-transitory storage medium to perform the image characterization method to generate the image characterization value characterizing the person or object to be classified.

* * * * *